(12) United States Patent
Eo et al.

(10) Patent No.: US 10,503,009 B2
(45) Date of Patent: Dec. 10, 2019

(54) INTEGRATED POLARIZER FILM AND LIQUID CRYSTAL DISPLAY INTEGRATED WITH THE SAME POLARIZER FILM

(71) Applicant: LG Display Co., Ltd., Seoul (KR)

(72) Inventors: Yoonjung Eo, Paju-si (KR); Sejeon Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/281,446

(22) Filed: Sep. 30, 2016

(65) Prior Publication Data

US 2017/0090241 A1    Mar. 30, 2017

(30) Foreign Application Priority Data

Sep. 30, 2015    (KR) .......................... 10-2015-0138240

(51) Int. Cl.
*G02F 1/1335*    (2006.01)
*F21V 8/00*    (2006.01)

(52) U.S. Cl.
CPC .. *G02F 1/133606* (2013.01); *G02F 1/133528* (2013.01); *G02F 2202/28* (2013.01)

(58) Field of Classification Search
CPC ......... G02F 1/133504; G02F 1/133528; G02F 2202/28
See application file for complete search history.

(56) References Cited

U.S. PATENT DOCUMENTS

| | | | | |
|---|---|---|---|---|
| 5,600,462 A * | 2/1997 | Suzuki | ...................... | F21V 5/02 349/112 |
| 7,244,476 B2 * | 7/2007 | Sumida | .................. | G02F 1/1335 349/122 |
| 7,961,278 B2 * | 6/2011 | Ohta | ...................... | G02B 5/045 349/113 |
| 9,863,593 B2 * | 1/2018 | Sakuragi | .................. | E06B 3/66 |
| 2008/0049165 A1 * | 2/2008 | Min | ...................... | G02B 3/0043 349/64 |
| 2008/0049330 A1 * | 2/2008 | Tolbert | .............. | G02F 1/133606 359/599 |
| 2009/0323308 A1 * | 12/2009 | Chang | ............... | G02F 1/133606 362/97.1 |
| 2017/0153336 A1 * | 6/2017 | Kawanabe | ............... | A61B 6/52 |
| 2017/0153362 A1 * | 6/2017 | Cho | ...................... | G02B 5/0242 |

* cited by examiner

*Primary Examiner* — Dung T Nguyen
(74) *Attorney, Agent, or Firm* — Polsinelli PC

(57) ABSTRACT

The present disclosure relates to an integrated polarizer film and a liquid crystal display integrated with the same polarizer film. The liquid crystal panel according to the present disclosure comprises: a liquid crystal panel; an upper polarizer film having a first light transmission axis and disposed on a top surface of the liquid crystal panel; a light diffusion layer embedded lower polarizer film having a second light transmission axis and disposed on a bottom surface of the liquid crystal panel; and an upper prism sheet laminated under the bottom surface of the light diffusion layer embedded lower polarizer film by a low refractive adhesive layer, and including a prism pattern having a first prism pattern and a second prism pattern smaller than the first prism pattern, wherein topmost portions of the first prism pattern are immersed into the low refractive adhesive layer, wherein the upper prism sheet is combined with the light diffusion layer embedded lower polarizer film, and wherein an air layer is inserted between the low refractive adhesive layer and the second prism pattern.

20 Claims, 6 Drawing Sheets

1.20 < n of ADH < 1.60

1.40 < n of ADM < 1.60
1.20 < n of ADL < 1.40 n of ADH < 1.55

1.40 < n of ADM1, ADM2 < 1.60
1.20 < n of ADL1, ADL2 < 1.40

INTEGRATED POLARIZER FILM AND LIQUID CRYSTAL DISPLAY INTEGRATED WITH THE SAME POLARIZER FILM

CROSS-REFERENCE TO RELATED APPLICATION

This application claims priority from and the benefit under 35 U.S.C. § 119(a) of Korean Patent Application No. 10-2015-0138240 filed on Sep. 30, 2015, which is incorporated herein by reference in its entirety.

BACKGROUND

Field of the Disclosure

The present disclosure relates to a display device, and more particularly to an integrated polarizer film and a liquid crystal display (or, LCD) integrated with the same polarizer film. Although the present disclosure is suitable for a wide scope of applications, it is particularly suitable for an LCD in which optical sheets for enhancing the uniformity and the convergence of the back light supplied from the back light unit are combined (or integrated) with the lower polarizer film.

Discussion of the Background

Nowadays, due to characteristics of light weight, slim thickness, low consumption electric power, a liquid crystal display device (or, LCD) has been widely applied in many electronic devices. The LCD is applied to portable computers such as a notebook PC, office automation devices, and audio/video devices and so on. The most used LCD shows the picture data by modulating the luminescence of the light incident from the backlight unit by controlling the electric field applied to the liquid crystal layer.

As the liquid crystal display device is not a self-luminescent element, the liquid crystal display device requires a backlight unit for irradiating light to the liquid crystal display panel. There are two kinds of the back light unit for LCD, one is a direct type back light unit and the other is an edge type back light system. For the direct type back light unit, a plurality of light sources is disposed under the back side of the LCD panel so that the light is directly radiated from the light source to the overall surface of the LCD panel. On the other hands, for the edge type back light unit, the light source is equipped at the circumferences of the transparent light guide plate. The light is radiated from the light source to the side surface of the light guide panel, and is refracted and/or reflected to the front side on which the LCD panel is disposed.

The edge type backlight unit has a merit of thinner thickness than the direct type backlight unit. Recently, for the light source of the backlight unit, a light emitting diode (or LED) is mainly used. Especially, mostly used is the edge type backlight unit in which one side of the light guide disposed under the flat display panel such as a liquid crystal display panel.

Hereinafter, referring to FIGS. 1 and 2, we will explain about the LCD having the edge type back light unit according to the related art. FIG. 1 is a perspective view illustrating a structure of the liquid crystal display having the edge type back light unit according to the related art. FIG. 2 is a cross sectional view along the cutting line I-I' of FIG. 1 for illustrating the structure of the liquid crystal display having the edge type back light unit according to the related art.

Referring to FIGS. 1 and 2, the liquid crystal display according to the related art comprises a liquid crystal panel (or liquid crystal display panel) LCP, and an edge type backlight unit EBLU disposed below the liquid crystal panel LCP. The liquid crystal panel LCP includes a liquid crystal layer LC between an upper glass substrate SU and a lower glass substrate LU. The liquid crystal layer LC includes any type of liquid crystal materials.

The edge type backlight unit EBLU includes a light source LS, a light guide plate LG, and a plurality of optical sheets OPT. The light radiated from the light source LS is diffused in the light guide plate LG and refracted to the upper surface of the light guide plate LG where the liquid crystal panel LCP is located. Further, below the light guide plate LG, a reflective plate REF is disposed for reflecting the leaked light from the bottom surface of the light guide plate LG.

A cover bottom CB is disposed below the reflective plate REF. The cover bottom CB has a vessel shape for housing the edge type back light unit EBLU. The cover bottom CB is made of a material having a high thermal conductivity for radiating the heat from the light source LS to outside of the cover bottom CB easily and a high strength for preventing the elements therein. For example, the cover bottom CB can be made of Aluminum (Al), Aluminum Nitride (AlN), Electrolytic Galvanized Iron (EGI), Stainless Steel (SUS), Aluminum-Zinc Alloy Coated steel sheet (i.e, Galvalume), Aluminum coated steel sheet (i.e, ALCOSTA), or Tin coated plate (i.e, SPTE (Steel Plate Tin Electric), SPTH (Steel Plate Tin Hot-dip) or SPTFS (Steel Plate Tin Free Steel)). Furthermore, ultra-high thermal conductive materials can be coated on the surface of the plate for the cover bottom CB.

A guide panel GP and a top case TC are assembled with surrounding the circumferences of the liquid crystal panel LCP. As a molded frame made of a fiber glass reinforced plastic, the guide panel GP wraps the circumferences of the upper surface and the four sides of the liquid crystal panel LCP and the side surfaces of the edge type backlight unit EBLU. The guide panel GP supports the liquid crystal panel LCP, and evenly maintains the gap between the liquid crystal panel LCP and the optical sheets OPT. The top case TC made of a coated metal plate such as Electrolytic Galvanized Iron (EGI) covering the upper and side surfaces of the guide panel GP. The top case TC is fixed at the guide panel GP or the cover bottom CB with hooks or screws.

The light source LS may be a light emitting device such as an LED supplying a high luminance with a lower electric power. The light source LS supplies light to the light guide plate LG For the edge type back light unit EBLU, the light source LS is located at one side of the liquid crystal panel LCP. The light source LS supplies light into the light guide plate LG through at least any one side surface of the light guide plate LG.

The light guide plate LG has a rectangular parallelepiped shape having an upper surface corresponding to the surface of the liquid crystal panel LCP. The upper surface of the light guide plate LG is facing the liquid crystal panel LCP. The light guide plate LG receives the light from the light source LS through one side surface, diffuses the light as being distributed evenly, and guides the distributed lights to the upper surface where the liquid crystal panel LCP is disposed.

The lights guided to the liquid crystal panel LCP by the light guide plate LG is not in condition to be used as back light yet. For example, the light may not have evenly distributed luminance over the whole surface of the liquid crystal panel LCP. Or, the light may be not condensed to the normal direction (or, viewing direction) to the surface of the liquid crystal panel LCP. Therefore, for satisfying the characteristics of the back light, the lights should be evenly distributed over the surface of the liquid crystal panel LCP and converged or condensed to the viewing direction.

To do so, the optical sheets OPT should be disposed between the light guide plate LG and the liquid crystal panel LCP. Hereinafter, referring to FIGS. 3 and 4, the structure of the optical sheets according to the related art will be explained. FIG. 3 is a cross sectional view illustrating the structure of the optical sheets including the diffusion sheet in the liquid crystal display according to the related art.

The optical sheets OPT disposed below the liquid crystal panel LCP in FIG. 3 shows a stack structure of the optical sheets OPT generally used. For example, the optical sheets have a lower prism sheet PRL, an upper prism sheet PRU and a diffusion film DIF sequentially stacked.

For the lower prism sheet PRL, a plurality of the trigonal prism patterns are disposed in parallel on the base film. Specially, ridges (a convex part) and furrows (a concave part) are alternately disposed, as the ridges are running to a first direction. The upper prism sheet PRU has trigonal prism patterns as the lower prism sheet PRL. The ridges of the upper prism sheet PRU are running to a second direction perpendicular to the first direction. As passing through the lower prism sheet PRL and the upper prism sheet PRU, the light radiated from the light guide plate LG has the Gaussian distribution characteristics on the central normal line to the liquid crystal panel LCP.

The diffusion sheet DIF plays a role for distributing the luminance of the light passing through the prism sheets PRL and PRU evenly over the whole surface of the liquid crystal panel LCP. For example, for the edge type back light unit, the side where the light source is disposed has brighter luminance than the opposite side. For the direct type back light unit, a small area where the light source is disposed is brighter than an intermediate range of the light sources. The diffusion film DIF distributes the brightness and/or luminance of the back light evenly over the whole surface of the liquid crystal panel LCP. To do so, the diffusion film DIF includes a plurality of beads BD irregularly distributed on the upper surface of the base film.

The light is controlled to be used as back light by the prism sheets PRL and PRU and the diffusion film DIF. However, as passing through these optical sheets, the light efficiency can be degraded. This causes a degradation of the energy efficiency required for generating the back light. Especially, the diffusion film DIF can severely degrade the light efficiency. To solve this problem, the Dual Brightness Enhancement Film has been suggested. FIG. 4 is a cross section view illustrating the structure of the optical sheets having the dual brightness enhancement film in the liquid crystal display according to the related art.

The dual brightness enhancement film DBEF can enhance the light efficiency as reflecting again to the upper surface the light leaked by the reflection as a high refraction layer and a low refraction layer are alternately stacked. Referring to FIG. 4, the structure is very similar to that of FIG. 3. The difference is that the dual brightness enhancement film DBEF is replaced with the diffusion film DIF.

The optical sheets according to the related art are loaded or stacked on each other, between the liquid crystal panel LCP and the light guide plate LG In detail, the upper prism sheet PRU is laid down on the lower prism sheet PRL. Therefore, between the upper prism sheet PRU and the lower prism sheet PRL, there is an air layer. The air layer has a different refractive index from those of the prism sheets PRL and PRU. Therefore, as passing the air layer, the lights can be diffused.

The diffusion film DIF or the dual brightness enhancement film DBEF is laid down on the upper prism sheet PRU. Therefore, further the air layer exists between the upper prism sheet PRU and the diffusion film DIF or between the upper prism sheet PRU and the dual brightness enhancement film DBEF. As passing the further air layer, the light can be further diffused.

With these loading or stacking structure of the optical sheets OPT, it is difficult to make thinner the thickness of the back light unit. This causes a drawback for making a thinner liquid crystal display. In an effort to resolve this issue, there has been a suggestion to bond the optical sheets with each other to make a thin optical sheet. In that case, as the air layer (or air gap) is removed, it is difficult to get a diffusion effect by the air layer, and then it is difficult to get evenly distributed brightness or luminance. Further, a moiré, a rainbow mura, or hot spot patterns can be generated. The uneven brightness and/or the unexpected patterns are unacceptable for back light. As the result, for a thinner liquid crystal display, it is required to develop advanced structures to make thin optical sheets.

SUMMARY

Accordingly, the present disclosure is directed to an ultra-thin liquid crystal display integrated (or combined) with optical sheets. Another object of the present disclosure is to provide an ultra-thin liquid crystal display device having a light diffusion layer embedded lower polarizer film which is attached under the liquid crystal panel so that the diffusion film is integrated into the polarizer film. Still another object of the present disclosure is to provide an ultra-thin liquid crystal display integrated with the optical sheet by embedding a light diffusion layer into the lower polarizer film, and laminating the prism sheet onto the lower polarizer film. Yet another object of the present disclosure is to provide an ultra-thin liquid crystal display having the integrated structure of the liquid crystal panel with the prism sheet without luminance defects such as the moiré and/or rainbow mura.

In order to achieve these and other advantages in accordance with the present disclosure, a liquid crystal panel comprises: a liquid crystal panel; an upper polarizer film having a first light transmission axis and disposed on a top surface of the liquid crystal panel; a light diffusion layer embedded lower polarizer film having a second light transmission axis and disposed on a bottom surface of the liquid crystal panel; and an upper prism sheet laminated under the bottom surface of the light diffusion layer embedded lower polarizer film by a low refractive adhesive layer, and including a prism pattern having a first prism pattern and a second prism pattern smaller than the first prism pattern, wherein topmost portions of the first prism pattern are immersed into the low refractive adhesive layer, wherein the upper prism sheet is combined with the light diffusion layer embedded lower polarizer film, and wherein an air layer is inserted between the low refractive adhesive layer and the second prism pattern.

In one embodiment, the light diffusion layer embedded lower polarizer film includes: a base sheet having a refractive index, m; a light diffusion adhesive layer disposed on the top surface of the base sheet; and a polarizer sheet laminated on a top surface of the base sheet by the light diffusion adhesive layer.

In one embodiment, the light diffusion adhesive layer includes a material of which haze value is 60% at least.

In one embodiment, a refractive index of the light diffusion adhesive layer is equal to or higher than 1.20 and is lower than m.

In one embodiment, the light diffusion adhesive layer includes: a first adhesive layer of which the refractive index is equal to and higher than 1.20 and is equal to and lower than n, wherein n is lower than m; and a second adhesive layer of which the refractive index is higher than n and is lower than m, wherein the second adhesive layer is disposed on the top surface of the first adhesive layer.

In one embodiment, the first prism pattern has a first pitch, the second prism pattern has a second pitch smaller than the first pitch, and a plurality of the first prism pattern and a plurality of the second prism pattern are disposed alternately each other.

In one embodiment, the first pitch is 30~50 μm and the second pitch is 20~30 μm, when a distance between the bottom surface of the liquid crystal panel and the top of the first prism pattern of the upper prism sheet is 210~280 μm.

In one embodiment, the liquid crystal display further comprises: a lower prism sheet disposed under the upper prism sheet, wherein the lower prism sheet includes: a third prism pattern being same with the first prism pattern; and a fourth prism pattern being same with the second prism pattern, wherein an arrangement direction of the first prism is different from an arrangement direction of the third prism, and wherein an arrangement direction of the second prism is different from an arrangement direction of the fourth prism.

In one embodiment, the lower prism sheet is integrated with the upper prism sheet by a low refractive adhesive layer of which the refractive index is equal to or higher than 1.20 and is lower than m, wherein topmost portions of the third prism is immersed into the low refractive adhesive layer.

In one embodiment, the low refractive adhesive layer includes: a first adhesive layer of which the refractive index is equal to and higher than 1.20 and is equal to and lower than n, wherein n is lower than m; and a second adhesive layer of which the refractive index is higher than n and is lower than m, wherein the second adhesive layer is disposed on the top surface of the first adhesive layer.

Further, a polarizer film according to the present disclosure comprises: a base sheet being transparent; a light diffusion adhesive layer disposed on the top surface of the base sheet; and a polarizer sheet having a light transmission axis and laminated on a top surface of the base sheet by the light diffusion adhesive layer; a low refractive adhesive layer disposed under a bottom surface of the base sheet; a prism sheet laminated under the bottom surface of the base sheet by the low refractive adhesive layer, and including a prism pattern having a first prism pattern and a second prism pattern smaller than the first prism pattern; and an air layer between the low refractive adhesive layer and the second prism pattern, wherein topmost portions of the first prism pattern are immersed into the low refractive adhesive layer.

In one embodiment, the base sheet has a refractive index, m, and a refractive index of the light diffusion adhesive layer is equal to or higher than 1.20 and is lower than m.

In one embodiment, the base sheet has a refractive index, m, and wherein the light diffusion adhesive layer includes: a first adhesive layer of which the refractive index is equal to and higher than 1.20 and is equal to and lower than n, wherein n is lower than m; and a second adhesive layer of which the refractive index is higher than n and is lower than m, wherein the second adhesive layer is disposed on the top surface of the first adhesive layer.

In one embodiment, the light diffusion adhesive layer includes a material of which haze value is 60% at least.

In one embodiment, the first prism pattern has a first pitch, and the second prism pattern has a second pitch smaller than the first pitch, and a plurality of the first prism pattern and a plurality of the second prism pattern are disposed alternately each other.

The liquid crystal panel according to the present disclosure has a structure in which the diffusion film or the dual brightness enhancement film is eliminated, or the diffusion layer is embedded into the lower polarizer film. As the result, the thickness of the lower polarizer film can be remarkably thin. In addition, the ultra-thin liquid crystal display has the structure in which the upper prism sheet is integrated with the light diffusion layer embedded lower polarizer film. That is, as the lower polarizer and the upper prism sheet are integrated or combined as one optical sheet. Furthermore, the lower polarizer film, the upper prism sheet and the lower prism sheet are integrated or combined so as to be one optical sheet. As the result, the optical sheet is not disposed under the liquid crystal panel but the optical sheet is integrated with the liquid crystal panel. Adopting the light diffusion adhesive layer, the low refractive adhesive layer and the variable pitch prism pattern, luminance defection and/or various mura pattern can be removed.

It is understood that both the foregoing general description and the following detailed description are exemplary and explanatory are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Figure 1:
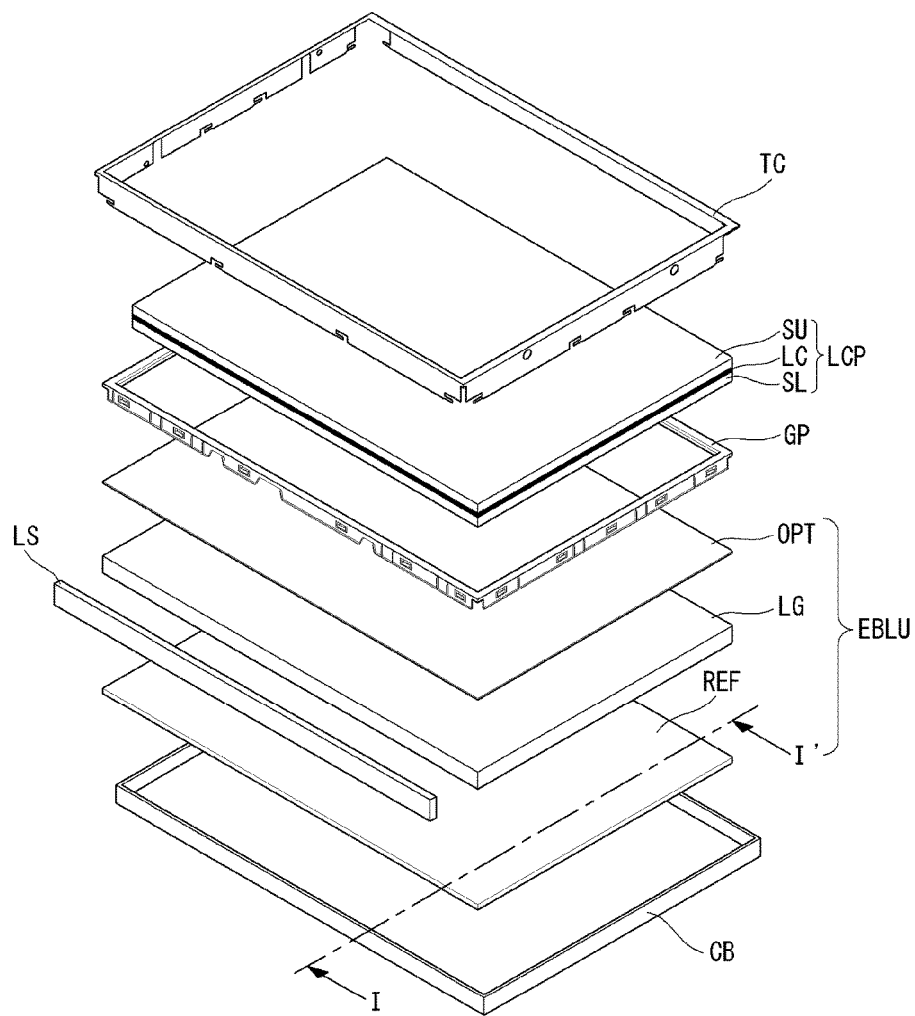
FIG. 1 is a perspective view illustrating a structure of the liquid crystal display having an edge type back light unit according to the related art.
Figure 2:
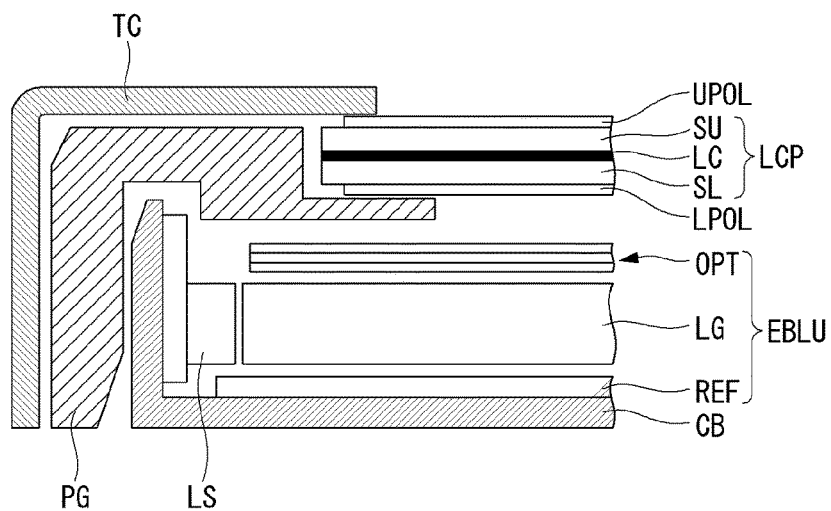
FIG. 2 is a cross sectional view along the cutting line I-I' of FIG. 1 for illustrating the structure of the liquid crystal display having the edge type back light unit according to the related art.

Referring to attached figures, we will explain aspects of the present disclosure. Like reference numerals designate like elements throughout the detailed description. However, the present disclosure is not restricted by these aspects but can be applied to various changes or modifications without changing the technical spirit. In the following embodiments, the names of the elements are selected for ease of explanation and may be different from actual names.

First Embodiment

Figure 5:
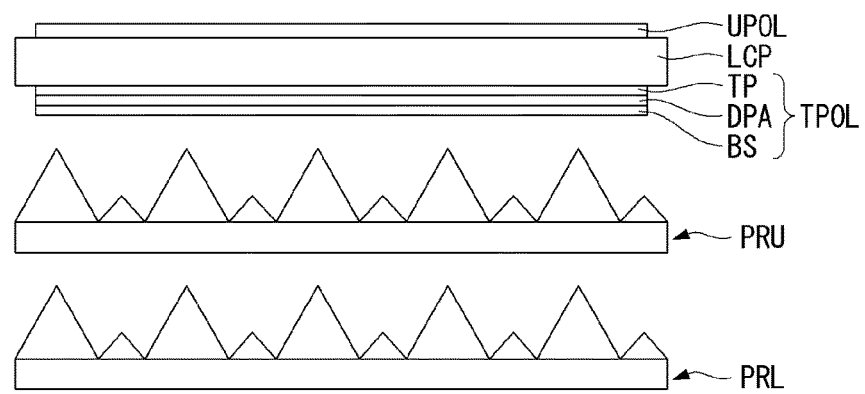
FIG. 5 is a cross-sectional view illustrating a structure of a liquid crystal display having a light diffusing layer embedded in a lower polarizer film according to a first embodiment of the present disclosure.
Figure 6:
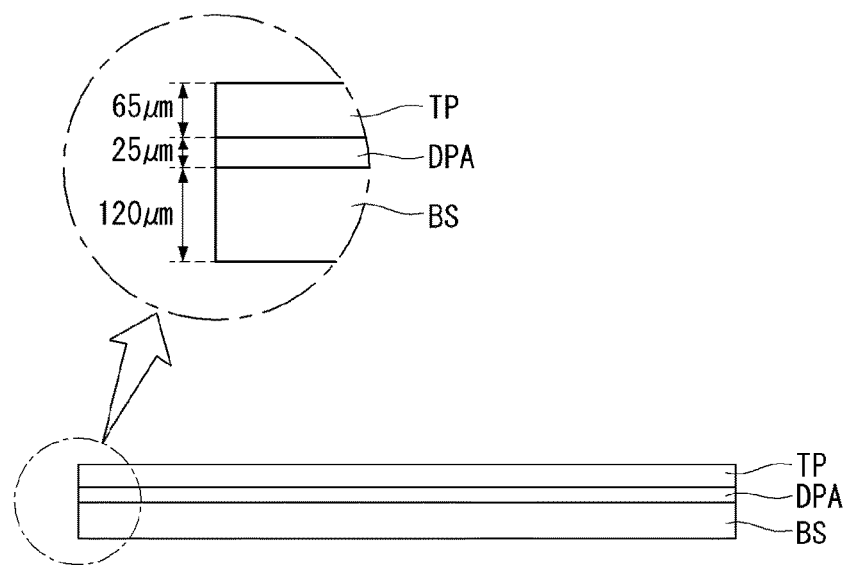
FIG. 6 is a cross sectional view illustrating a structure of the light diffusing layer embedded in the lower polarizer film according to the first embodiment of the present disclosure.
Figure 7:
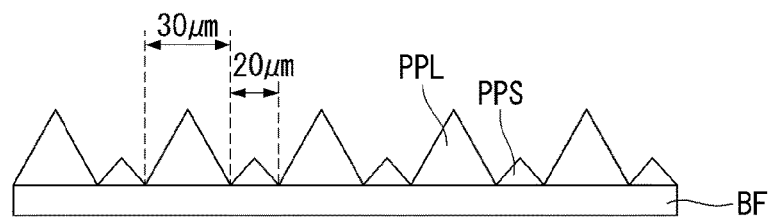
FIG. 7 is a cross sectional view illustrating a structure of a prism sheet included in the liquid crystal display according to the first embodiment of the present disclosure.

A first embodiment of the present disclosure will be explained with reference to FIGS. 5 to 7. FIG. 5 is a cross-sectional view illustrating a structure of a liquid crystal display having a lower polarizer film with an embedded light diffusing layer according to the first embodiment of the present disclosure. FIG. 6 is a cross sectional view illustrating a structure of the lower polarizer film with the embedded light diffusing layer according to the first embodiment of the present disclosure. FIG. 7 is a cross sectional view illustrating a structure of a prism sheet integrated into the liquid crystal display according to the first embodiment of the present disclosure.

Referring back to FIG. 5, the liquid crystal display according to the first embodiment of the present disclosure comprises a liquid crystal panel LCP, an upper polarizer film UPOL and a light diffusion layer embedded to a lower polarizer film TPOL (or a lower polarizer film with an embedded light diffusion layer). Further, the liquid crystal panel LCP includes an upper substrate and a lower substrate which are joined each other with a liquid crystal layer there-between. On the upper surface of the liquid crystal panel LCP, the upper polarizer film UPOL is attached. On the lower surface of the liquid crystal panel LCP, the light diffusion layer embedded into the lower polarizer film TPOL is attached.

The upper polarizer film UPOL has a first light transmission axis or a first light absorption axis arranged to a first direction. The lower polarizer film TPOL having the light diffusion layer has a second light transmission axis or a second light absorption axis arranged to a second direction. When the liquid crystal panel LCP is in a normally black mode, the first transmission light axis may be perpendicular to the second light transmission axis. Otherwise, for a normally white mode, the first light transmission axis may be parallel to the second light transmission axis.

The light diffusion layer embedded into the lower polarizer film TPOL includes a polarizer sheet TP laminated on the top surface of a base sheet BS by a light diffusion adhesive DPA. The light diffusion adhesive DPA includes the light diffusion layers which may be embedded into the lower polarizer film TPOL. The light diffusion adhesive DPA may have a haze value equal to or larger than 60%. The base sheet BS may be a transparent film of which the refractive index is 1.66 or higher. For example, the base sheet BS includes polyethylene terephthalate (or PET).

A polarizer film (or polarizer sheet) can be easily deformed by moisture included in the air. Therefore, during the polarizer film is delivered or stored before it is attached to any device, the protective film may be attached or deposited at the upper and lower surfaces of the polarizer film. The light diffusion layer embedded into the lower polarizer film TPOL has a protective film (not shown in figures) attached on the polarizer sheet TP during it is delivered or stored. However, at the lower surface of the polarizer sheet TP, the base sheet BS (instead of the protective film) is attached (or laminated) by the light diffusion adhesive DPA. Here, the base sheet BS may be made of a material having a strong moisture resistance.

As shown in FIG. 6, the polarizer sheet TP is attached on the base sheet BS with the light diffusion adhesive DPA. The polarizer sheet TP may have a thickness of 65 µm (micrometer), the light diffusion adhesive DPA may have a thickness of 25 µm and the base sheet BS may have a thickness of 120 µm. Therefore, the total thickness of the light diffusion layer embedded into the lower polarizer film TPOL may be 215 µm. Comparing with a 500 µm thickness of the lower polarizer according to the related art, the lower polarizer film according to the present disclosure can be provided in forming an ultra-thin liquid crystal display.

Typically, a thickness of the diffusion film DIF or the dual brightness enhancement film DBEF is several thousands µm (micrometer). With the lower polarizer film according to the first embodiment of the present disclosure without using such a diffusion film and a dual brightness enhancement film, an ultra-thin liquid crystal display can be manufactured.

Comparing with the related art, in the structure of the liquid crystal display using the light diffusion layer embedded into the lower polarizer film TPOL according to the first embodiment of the present disclosure, the prism sheets PRL and PRU are disposed so close to the liquid crystal panel LCP. Further, the air layer between the diffusion film DIF and the liquid crystal panel LCP or between the dual brightness enhancement film DBEF and the liquid crystal panel LCP does not exist anymore. Therefore, the brightness may not be evenly distributed and a moiré or a rainbow mura may be caused.

To solve these problems, the liquid crystal display according to the first embodiment of the present disclosure includes a prism sheet having varying pitches, as shown in FIG. 7. For example, the prism sheet comprises a base film BF, a first prism pattern PPL having a first pitch, and a second prism pattern PPS having a second pitch in which the first prism pattern PPL and the second prism pattern PPS are alternately disposed.

The first pitch may be 30~50 µm and the second pitch may be 20~30 µm. Thus, the second pitch is at least 10 µm smaller than the first pitch. For example, one first prism pattern PPL and one second prism pattern PPS are alternately disposed each other. As a result, by a difference of the height of the first prism pattern and the second prism pattern, a more empty space, i.e. an air layer, can be formed. For another example, the number of the first prism pattern PPL with a higher height can be disposed with a fewer number than the number of the second prism pattern PPS with a lower height. For a further example, one first prism pattern PPL can be disposed at every two second prism patterns PPS. In that case, much more empty spaces formed by a height difference between the first prism pattern and the second prism pattern, so that the light diffusion can be more effectively caused by the air layer.

In the first embodiment, two prism sheets having the varying prism pattern may be included. For example, as shown in FIG. 5, an upper prism sheet PRU and a lower prism sheet PRL are stacked each other. The upper prism sheet PRU is disposed below the lower polarizer film TPOL having the embedded light diffusion layer. The lower prism sheet PRL is disposed below the upper prism sheet PRU. The upper prism sheet PRU and the lower prism sheet PRL have the same prism pattern. The arrangement direction of the prism pattern for the upper prism sheet PRU is different from the arrangement direction of the prism pattern for the lower prism sheet PRL.

The liquid crystal display according to the first embodiment of the present disclosure has the structure in that the light diffusion layer embedded into the lower polarizer film TPOL is attached on the bottom surface of the liquid crystal panel LCP. As the light diffusion adhesive layer DPA is embedded into the lower polarizer film TPOL, the liquid crystal display may be fabricated to be thinner than that of the related art. Thus, although the air layer formed between the liquid crystal panel and the lower polarizer film, the upper prism sheet PRU has a bigger air layer in the present disclosure.

Figure 3:
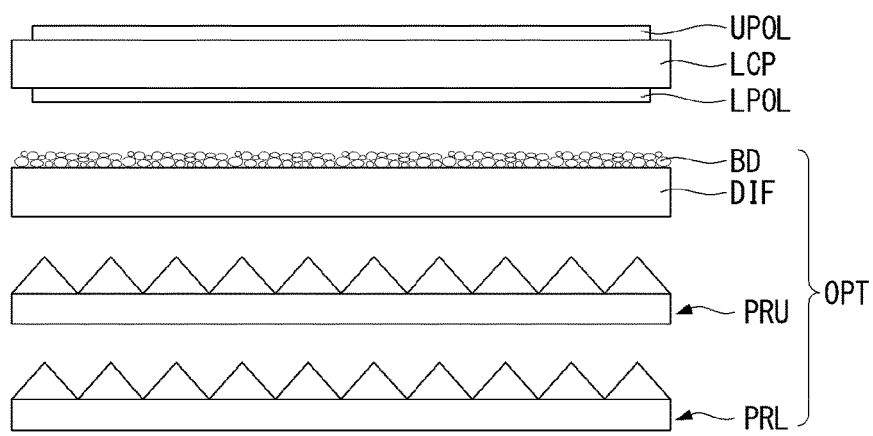
FIG. 3 is a cross sectional view illustrating a structure of optical sheets including a diffusion sheet in the liquid crystal display according to the related art.
Figure 4:
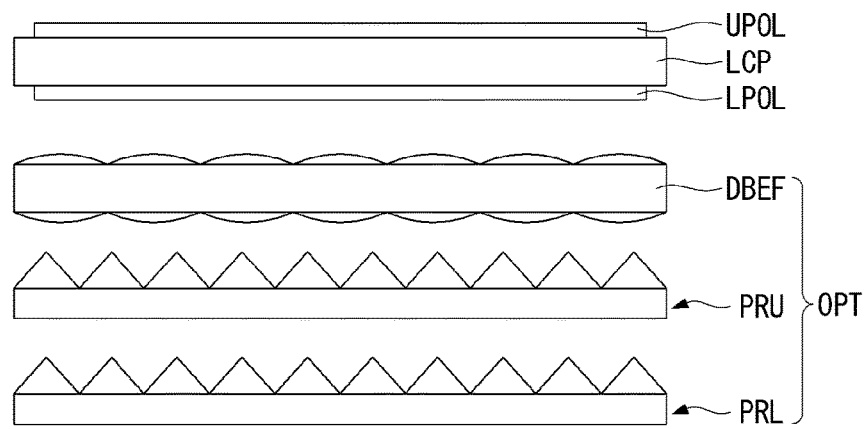
FIG. 4 is a cross section view illustrating a structure of the optical sheets having a BEDF in the liquid crystal display according to the related art.

In the liquid crystal display according to the related arts as shown in FIG. 3, the diffusion film DIF may be merely attached to the lower polarizer film LPOL to have a thin thickness of the optical sheets. However, in that case, the beads BD scattered on the upper surface of the diffusion film DIF are buried into the adhesive, so that the beads BD do not work as diffusion elements. As the results, a moiré or a rainbow mura may be caused. Therefore, the present disclosure cannot be accomplished by merely attaching the diffusion film DIF in the related art.

Second Embodiment

Figure 8:
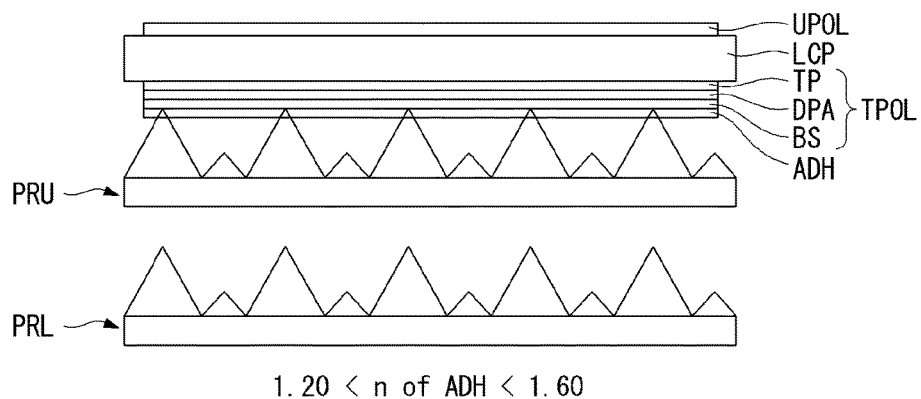
FIG. 8 is a cross sectional view illustrating a structure of an optical sheet integrated with the liquid crystal display according to a second embodiment of the present disclosure.

Hereinafter, a second embodiment of the present disclosure will be explained with reference to FIG. 8. FIG. 8 is a cross sectional view illustrating a structure of an optical sheet integrated into a liquid crystal display according to the second embodiment of the present disclosure. In the first embodiment, by eliminating the diffusion film DIF or the dual brightness enhancement film DBEF, but adapting the lower polarizer sheet TPOL having the light diffusion layer, it is possible to provide an ultra-thin liquid crystal display. In the second embodiment, by integrating or combining the upper prism sheet PRU with the lower prism sheet TPOL with the embedded light diffusion layer, much thinner liquid crystal display can be provided.

Referring to FIG. 8, the most elements of the liquid crystal display according to the second embodiment is similar with those of the first embodiment. Therefore, the explanation about the same elements will not be duplicated. The second embodiment provides a liquid crystal display in which the upper prism sheet PRU is integrated with the lower prism sheet TPOL having the light diffusion layer. In the first embodiment, the upper prism sheet PRU is merely disposed below the lower prism sheet TPOL with the embedded light diffusion layer. Thus, the liquid crystal display suggested by the second embodiment can have a thinner thickness than that of the first second embodiment.

The liquid crystal display according to the second embodiment comprises an upper prism sheet PRU integrated (or combined) with a lower polarizer sheet TPOL with the embedded light diffusion layer by an adhesive layer ADH. Especially, the topmost portions of the prism patterns of the upper prism sheet PRU are immersed into the adhesive layer ADH. Further, as the upper prism sheet PRU has a first prism pattern PPL having a first pitch and a second prism sheet PPS having a second pitch which are alternately disposed, the topmost portions of the first prism pattern PPL higher than the second prism pattern PPS are immersed into the adhesive layer ADH.

In addition, the refractive index of the adhesive layer ADH is higher than that of the air and is lower than that of the base sheet BS of the lower polarizer sheet TPOL having the light diffusion layer. For example, for the case that the refractive index of the base sheet BS is 1.60 or higher, the refractive index (n) of the adhesive layer ADH is higher than 1.20 and is lower than 1.60. For the case that the refractive index of the base sheet BS is 1.50, the refractive index (n) of the adhesive layer ADH is higher than 1.20 and is lower than 1.50.

Even though some portions (i.e., topmost portions) of the first prism pattern PPL are immersed into the adhesive layer ADH, the ridges of the second prism pattern PPS are apart from the adhesive layer ADH. That is, the air layer can be formed between the adhesive layer ADH and the second prism pattern PPS. When the upper prism sheet PRU does not have varying pitches, the topmost portions of all prism patterns are immersed into the adhesive layer ADH, and the empty spaces to be an air layer can be significantly reduced. As a result, light cannot be scattered or diffused enough, so that a moiré or a rainbow mura may be caused. However, in the second embodiment, the prism pattern of the upper prism sheet PRU has varying pitches, so that much more empty spaces to be the air layer can be formed, thereby the moiré or the rainbow mura can be prevented in the present disclosure.

Here, the size difference in the varying prism pitches is related to the gap between the liquid crystal panel LCP and the upper prism sheet PRU. The varying prism pitches are to remove a moiré or a rainbow mura caused by the lower polarizer film TPOL. That is, depending upon the thickness of the lower polarizer film TPOL, the size difference of the varying pitches in the upper prism sheet PRU can be decided.

The thickness of the embedded light diffusion layer into the lower polarizer film TPOL can be mainly decided by the thickness of the base sheet BS. In FIG. 6, the total thickness of 80 μm of the polarizer sheet TP and the light diffusion adhesive DPA is almost fixed value. However, the thickness of the base sheet BS can be varied. This thickness is not varied arbitrary, and is decided by the varying pitch value of the prism sheets PRL and/or PRU.

To ensure the function of the prism sheet with an ultra-thin thickness, the lower polarizer film TPOL with the embedded light diffusion layer needs to have a thickness of in the range of 210 μm~280 μm. When this ultra-thin lower polarizer film TPOL with the embedded light diffusion layer is laminated to the liquid crystal panel LCP, the distance from the bottom surface of the liquid crystal panel and the top of the first prism pattern of the upper prism sheet is very close, i.e., the combining gap is in the range of 210 μm~280 μm. For preventing a moiré and/or a rainbow mura, the first pitch for the first prism pattern PPL can be in the range of 30~50 μm, and the second pitch for the second prism pattern PPS can be in the range of 20~30 μm. Especially, the second pitch is at least about 10 μm less than the first pitch. Here, the pitch means a distance between neighboring two prism patterns. Further it may be the same as the height of the prism pattern.

More specifically, when a minimum thickness of the lower polarizer film TPOL with the embedded light diffusion layer is about 215 μm (a thickness of the base sheet BS is about 125 μm), the pitch of the first prism pattern PPL is about 30 μm and the pitch of the second prism pattern PPS is about 20 µm. Otherwise, when the minimum thickness of the lower polarizer film TPOL with the embedded light diffusion layer is about 278 µm (a thickness of the base sheet BS is about 188 µm), the pitch of the first prism pattern PPL is about 40 µm and the pitch of the second prism pattern PPS is about 30 µm. Here, the refractive index of the prism patterns PPL and PPS is at least 1.57.

Third Embodiment

Figure 9:
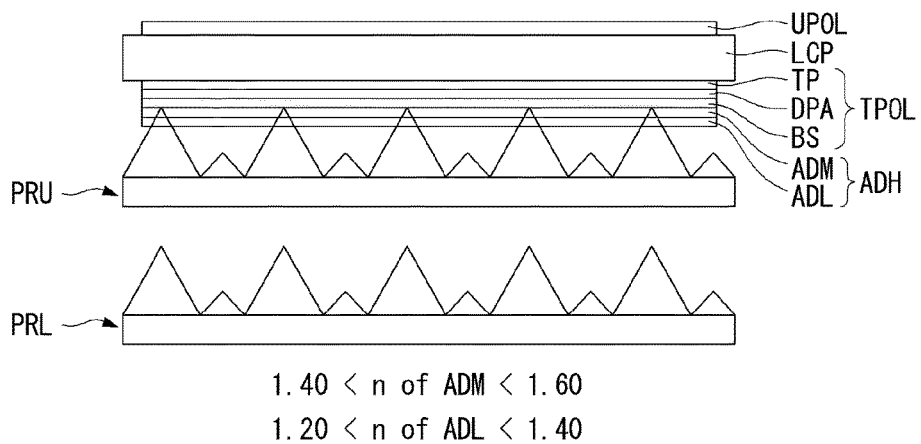
FIG. 9 is a cross sectional view illustrating a structure of an optical sheet integrated with the liquid crystal display according to a third embodiment of the present disclosure.

Hereinafter, a third embodiment of the present disclosure will be explained with reference to FIG. 9. FIG. 9 is a cross sectional view illustrating a structure of an optical sheet integrated with a liquid crystal display according to the third embodiment of the present disclosure.

In the second embodiment, the structure of the liquid crystal display is that the upper prism sheet PRU is integrated with the lower polarizer film TPOL with the embedded light diffusion layer by the adhesive layer ADH. On the adhesive layer ADH, the base sheet BS of the lower polarizer film TPOL with the embedded light diffusion layer is attached. Therefore, at the interface between the adhesive layer ADH and the base sheet BS, the back light may be reflected, so that the light transmittance may be degraded.

In the third embodiment, the structure of the optical sheet to reduce the transmittance and/or luminance degradation at the interface between the adhesive layer ADH and the base sheet BS is suggested. Referring to FIG. 9, the liquid crystal display according to the third embodiment comprises an upper prism sheet PRU integrated or combined with a lower polarizer film TPOL having an embedded light diffusion layer by an adhesive layer ADH including a low refractive adhesive layer ADL and a middle refractive adhesive layer ADM. The middle refractive adhesive layer ADM can be disposed directly on the bottom surface of the base sheet BS, while the low refractive adhesive layer ADL can be disposed directly on the bottom surface of the middle refractive adhesive layer ADM.

Further, the topmost portions of the prism patterns of the upper prism sheet PRU are immersed into the low refractive adhesive layer ADL and the middle refractive adhesive layer ADM. As the upper prism sheet PRU has a first prism pattern PPL having a first pitch and a second prism sheet PPS having a second pitch which are alternately disposed, the topmost portions of the first prism pattern PPL having a height higher than that of the second prism pattern PPS are immersed into the low refractive adhesive layer ADL and the middle refractive adhesive layer ADM.

Here, the refractive index of the low refractive adhesive layer ADL is higher than that of the air and is lower than that of the middle refractive adhesive layer ADM. Further, the refraction index of the middle refractive adhesive layer ADM is higher than that of the low refractive adhesive layer ADL and is lower than that of the base sheet BS of the lower polarizer sheet TPOL having the light diffusion layer. For example, for the case that the refractive index of the base sheet BS is 1.60 or higher, the refractive index of the middle refractive adhesive layer ADM is higher than 1.40 and is lower than 1.60. Here, the refractive index of the low refractive adhesive layer ADL is equal to or higher than 1.20 and is equal to or lower than 1.40.

Otherwise, when the refractive index of the base sheet BS is 1.50, the refractive index of the middle refractive adhesive layer ADM is higher than 1.40 and is lower than 1.50. The refractive index of the low refractive adhesive layer ADL is equal to or higher than 1.20 and is equal to or lower than 1.40. For another example, when the refractive index of the base sheet BS is 1.50, the refractive index of the middle refractive adhesive layer ADM is higher than 1.35 and is lower than 1.50. In that case, the refractive index of the low refractive adhesive layer ADL is equal to or higher than 1.20 and is equal to or lower than 1.35.

As a result, most of all reflected light from the interface between the middle refractive adhesive layer ADM and the base sheet BS to the bottom direction is reflected again at the interface between the middle refractive adhesive layer ADM and the low refractive adhesive layer ADL and then it can be provided to the liquid crystal panel LCP. That is, by recycling the lost light at the liquid crystal display as the back light, the structure of the liquid crystal display of the third embodiment can enhance the transmittance and the luminance than that of the second embodiment.

Fourth Embodiment

Figure 10:
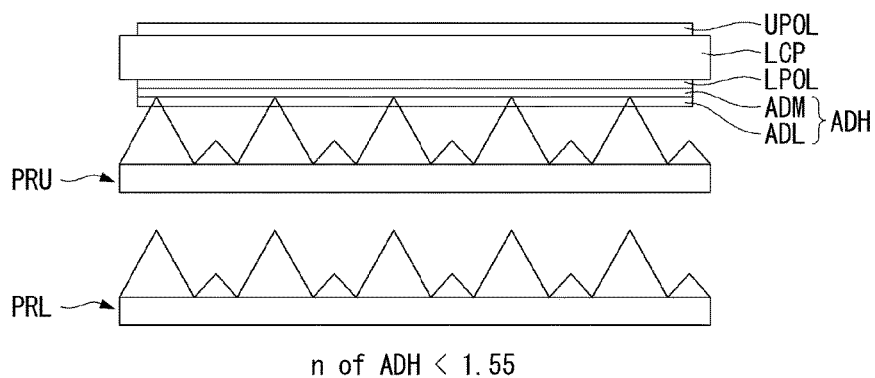
FIG. 10 is a cross sectional view illustrating a structure of an optical sheet integrated with the liquid crystal display according to a fourth embodiment of the present disclosure.

Hereinafter, a fourth embodiment of the present disclosure will be explained with reference to FIG. 10. FIG. 10 is a cross sectional view illustrating a structure of a liquid crystal display having an integrated optical sheet according to the fourth embodiment of the present disclosure.

In the fourth embodiment, the structure of the optical sheet in which all film elements for diffusing the lights are eliminated is suggested. For example, as shown in FIG. 10, the liquid crystal display according to the fourth embodiment comprises an upper prism sheet PRU integrated or combined with a lower polarizer film LPOL by an adhesive layer ADH including a low refractive adhesive layer ADL and a middle refractive adhesive layer ADM. The middle refractive adhesive layer ADM is disposed directly on the bottom surface of the lower polarizer film LPOL and the low refractive adhesive layer ADL is disposed directly on the bottom surface of the middle refractive adhesive layer ADM.

Further, the topmost portions of the prism patterns of the upper prism sheet PRU are immersed into the low refractive adhesive layer ADL and the middle refractive adhesive layer ADM. As the upper prism sheet PRU has a first prism pattern PPL having a first pitch and a second prism sheet PPS having a second pitch which are alternately disposed, the topmost portions of the first prism pattern PPL having a height higher than the second prism pattern PPS are immersed into the low refractive adhesive layer ADL and the middle refractive adhesive layer ADM.

Here, the refractive index of the middle refractive adhesive layer ADM is higher than 1.40 and is lower than 1.60. Further, the refractive index of the low refractive adhesive layer ADL is equal to or higher than 1.20 and is equal to or lower than 1.40.

The liquid crystal display according to the fourth embodiment does not include any elements for diffusing light such as a diffusion layer and a diffusion film. Further, the upper prism sheet PRU is attached to the lower polarizer film LPOL with the adhesive layer ADH. As a result, an ultra-thin liquid crystal display can be fabricated with the above disclosed structure of the fourth embodiment.

Fifth Embodiment

Figure 11:
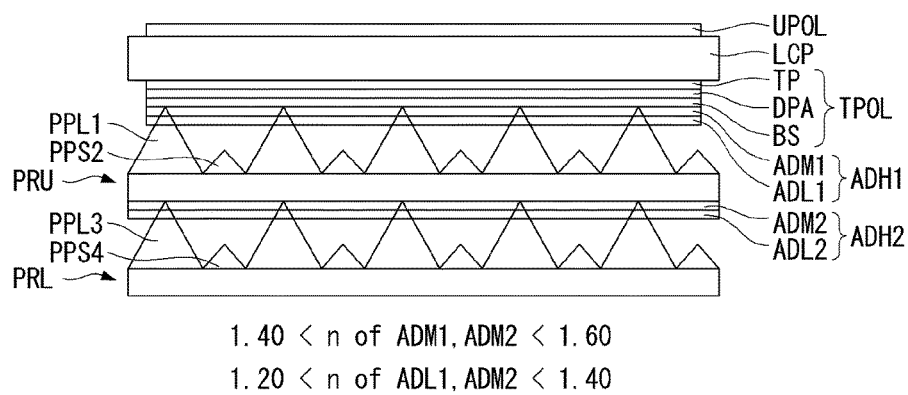
FIG. 11 is a cross sectional view illustrating a structure of an optical sheet integrated with the liquid crystal display according to a fifth embodiment of the present disclosure.

Hereinafter, a fifth embodiment of the present disclosure will be explained with reference to FIG. 11. FIG. 11 is a cross sectional view illustrating a structure of a liquid crystal display having an integrated optical sheet according to the fifth embodiment of the present disclosure.

From the second embodiment to the fourth embodiment, the structures in which the upper prism sheet PRU is integrated or combined with the lower polarizer film LPOL or TPOL are disclosed. In the fifth embodiment, the lower prism sheet PRL can be further integrated or combined with the upper prism sheet PRU. FIG. 11 shows that the lower prism sheet PRL is laminated on the bottom surface of the upper prism sheet PRU illustrated in FIG. 9 of the third embodiment.

Referring to FIG. 11, the liquid crystal display according to the fifth embodiment of the present disclosure comprises an upper prism sheet PRU integrated or combined with a lower polarizer film TPOL having an embedded light diffusion layer by a first adhesive layer ADH1 including a first low refractive adhesive layer ADL1 and a first middle refractive adhesive layer ADM1. The first middle refractive adhesive layer ADM1 can be disposed directly on the bottom surface of the base sheet BS, and the first low refractive adhesive layer ADL1 can be disposed directly on the bottom surface of the first middle refractive adhesive layer ADM1.

Further, the topmost portions of the prism patterns of the upper prism sheet PRU are immersed into the first low refractive adhesive layer ADL1 and the first middle refractive adhesive layer ADM1. As the upper prism sheet PRU has a first prism pattern PPL1 having a first pitch and a second prism sheet PPS2 having a second pitch which are alternately disposed, the topmost portions of the first prism pattern PPL1 having a height higher than that of the second prism pattern PPS2 are immersed into the first low refractive adhesive layer ADL1 and the first middle refractive adhesive layer ADM1.

In addition, the lower prism sheet PRL is integrated or combined with the upper prism sheet PRU by a second adhesive layer ADH2 including a second low refractive adhesive layer ADL2 and a second middle refractive adhesive layer ADM2. The lower prism sheet PRL may have the same structure as the upper prism sheet shown in FIG. 7. The second middle refractive adhesive layer ADM2 can be disposed directly on the bottom surface of the base film BF of the upper prism sheet PRU, and the second low refractive adhesive layer ADL2 can be disposed directly on the bottom surface of the second middle refractive adhesive layer ADM2.

Further, the topmost portions of the prism patterns of the lower prism sheet PRL are immersed into the second low refractive adhesive layer ADL2 and the second middle refractive adhesive layer ADM2. As the lower prism sheet PRL has a third prism pattern PPL3 having the first pitch and a fourth prism sheet PPS4 having the second pitch which are alternately disposed, the topmost portions of the third prism pattern PPL3 having a height higher than that of the fourth prism pattern PPS4 are immersed into the second low refractive adhesive layer ADL2 and the second middle refractive adhesive layer ADM2.

Here, the arrangement direction of the prism pattern for the upper prism sheet PRU is different from the arrangement direction of the prism pattern for the lower prism sheet PRL. For example, the arrangement direction of the prism pattern for the upper prism sheet PRU and the arrangement direction of the prism pattern for the lower prism sheet PRL may have an obtuse angle, an acute angle or the right angle. The angle between the direction of the prism pattern of the upper prism sheet PRU and the direction of the prism pattern of the lower prism sheet PRL can be orthogonal.

Here, the refractive index of the second middle refractive adhesive layer ADM2 is higher than 1.40 and is lower than 1.60. Further, the refractive index of the second low refractive adhesive layer ADL2 is equal to or higher than 1.20 and is equal to or lower than 1.40. As a result, most of all reflected light from the interface between the second middle refractive adhesive layer ADM2 and the bottom surface of the upper prism sheet PRU to the bottom direction is reflected again at the interface between the second middle refractive adhesive layer ADM2 and the second low refractive adhesive layer ADL2, and it can be provided to the liquid crystal panel LCP. That is, by recycling the lost light as the back light, the disclosed structure of the liquid crystal display of the fifth embodiment can enhance transmittance and luminance.

Here, for the convenience, although the structure in which the lower prism sheet PRL is further embedded or attached of the third embodiment is explained, this structure can be applied to other embodiments.

While the embodiment of the present invention has been described in detail with reference to the drawings, it will be understood by those skilled in the art that the invention can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

What is claimed is:

1. A liquid crystal display comprising:
   a liquid crystal panel;
   an upper polarizer film having a first light transmission axis and disposed on a top surface of the liquid crystal panel;
   a lower polarizer film having a second light transmission axis and disposed on a bottom surface of the liquid crystal panel; and
   an upper prism sheet laminated on the bottom surface of the lower polarizer film by a first refractive adhesive layer,
   wherein the first refractive adhesive layer includes a first adhesive layer having a refractive index being equal to and higher than 1.20 and equal to and lower than n, wherein n is lower than m, and a second adhesive layer having a refractive index being higher than n and lower than m, wherein the second adhesive layer is disposed on the top surface of the first adhesive layer,
   wherein the upper prism sheet has first and second prism patterns disposed alternately with each other and the first prism pattern or the second prism pattern is not consecutively positioned, and
   wherein each of the first and second prism patterns includes a single prism pattern the second prism pattern is smaller than the first prism pattern, the first prism pattern has topmost portions immersed into the first refractive adhesive layer, the upper prism sheet is integrated with the lower polarizer film; and
   an air layer disposed between the first refractive adhesive layer and the second prism pattern.

2. The display according to the claim 1, wherein the lower polarizer film includes:
   a base sheet having a refractive index of m;
   a light diffusion adhesive layer disposed on the top surface of the base sheet; and
   a polarizer sheet laminated on the base sheet by the first light diffusion adhesive layer.

3. The display according to claim 2, wherein the light diffusion adhesive layer includes a material having a Haze value of at least 60%.

4. The display according to claim 2, wherein the first refractive adhesive layer has a refractive index equal to or higher than 1.20 and is lower than m.

5. The display according to claim 2, wherein the first refractive adhesive layer is disposed on the bottom surface of the base sheet.

6. The display according to claim 1, wherein the first prism pattern has a first pitch and the second prism pattern has a second pitch, and the first pitch is larger than the second pitch.

7. The display according to claim 6, wherein the first pitch is about 30~50 μm and the second pitch is about 20~30 μm, and a distance between the bottom surface of the liquid crystal panel and the top of the first prism pattern of the upper prism sheet is about 210~280 μm.

8. The display according to claim 1, further comprising a lower prism sheet disposed below the upper prism sheet.

9. The display according to claim 8, wherein the lower prism sheet includes:
a third prism pattern having a size substantially the same as the first prism pattern; and
a fourth prism pattern having a size substantially the same as the second prism pattern,
wherein the first prism pattern has an arrangement direction different from that of the third prism pattern, and the second prism pattern has an arrangement direction different from that of the fourth prism pattern.

10. The display according to claim 9, wherein the lower prism sheet is integrated with the upper prism sheet by a second refractive adhesive layer having a refractive index being equal to or higher than 1.20 and lower than m,
wherein the third prism pattern has topmost portions immersed into the second refractive adhesive layer.

11. The display according to claim 10 wherein the second refractive adhesive layer includes:
a third adhesive layer having a refractive index being equal to and higher than 1.20 and equal to and lower than n, wherein n is lower than m; and
a fourth adhesive layer having a refractive index higher than n and lower than m,
wherein the fourth adhesive layer is disposed on the top surface of the third adhesive layer.

12. The display according to claim 1, wherein the first prism pattern and the second prism pattern include an apex having an acute angle in a cross-sectional view.

13. An integrated polarizer film comprising:
a transparent base sheet;
a light diffusion adhesive layer disposed on a top surface of the transparent base sheet; a polarizer sheet having a light transmittance axis and laminated on the top surface of the base sheet by the light diffusion adhesive layer,
wherein the first refractive adhesive layer includes a first adhesive layer having a refractive index being equal to and higher than 1.20 and equal to and lower than n, wherein n is lower than m, and a second adhesive layer having a refractive index being higher than n and lower than m, wherein the second adhesive layer is disposed on the top surface of the first adhesive layer;
a first refractive adhesive layer disposed on a bottom surface of the base sheet;
a first prism sheet laminated on the bottom surface of the base sheet by the first refractive adhesive layer, the first prism sheet having first and second prism patterns disposed alternately with each other, wherein the first prism pattern or the second prism pattern is not consecutively positioned and each of the first and second prism patterns includes a single prism pattern, and the second prism pattern being smaller than the first prism pattern; and
an air layer disposed between the first refractive adhesive layer and the second prism pattern,
wherein the first prism pattern has topmost portions immersed into the first refractive adhesive layer.

14. The integrated polarizer film according to claim 13, wherein the base sheet has a refractive index of m and the light diffusion adhesive layer has a refractive index equal to or higher than 1.20 and is lower than m.

15. The integrated polarizer film according to claim 14, wherein the light diffusion adhesive layer includes:
a first adhesive layer having a refractive index equal to and higher than 1.20 and equal to and lower than n, wherein n is lower than m; and
a second adhesive layer having a refractive index higher than n and lower than m, wherein the second adhesive layer is disposed on the top surface of the first adhesive layer.

16. The integrated polarizer film according to claim 13, wherein the light diffusion adhesive layer includes a material having a Haze value of at least 60%.

17. The integrated polarizer film according to claim 13, wherein the first prism pattern has a first pitch and the second prism pattern has a second pitch,
wherein the second pitch is smaller than the first pitch, and
the first and second patterns are disposed alternately each other.

18. The integrated polarizer film according to claim 13, further comprising a second prism sheet disposed below the first prism sheet.

19. The integrated polarizer film according to claim 18, the second prism sheet includes:
a third prism pattern being having a size substantially the same as the first prism pattern; and
a fourth prism pattern being having a size substantially the same as the second prism pattern,
wherein the first prism pattern has an arrangement direction is different from that of the third prism pattern, and the second prism pattern has an arrangement direction different from that of the fourth prism pattern.

20. The integrated polarizer film according to claim 19, wherein the second prism sheet is integrated with the first prism sheet by a second refractive adhesive layer having a refractive index being equal to or higher than 1.20 and lower than m, wherein the third prism pattern has topmost portions immersed into the second refractive adhesive layer.

* * * * *